United States Patent [19]
Watanabe et al.

[11] Patent Number: 5,850,275
[45] Date of Patent: Dec. 15, 1998

[54] LIQUID CRYSTAL DISPLAY

[75] Inventors: Makoto Watanabe; Osamu Sukegawa; Takahiko Watanabe, all of Tokyo, Japan

[73] Assignee: NEC Corporation, Tokyo, Japan

[21] Appl. No.: 789,429

[22] Filed: Jan. 29, 1997

[30] Foreign Application Priority Data

Jan. 30, 1996 [JP] Japan ................................ 8-013876

[51] Int. Cl.⁶ .......................... G02F 1/136; G02F 1/333; G02F 1/1345
[52] U.S. Cl. .......................... 349/152; 349/44; 349/110
[58] Field of Search .................... 349/110, 152, 349/44, 111

[56] References Cited

U.S. PATENT DOCUMENTS

| | | | |
|---|---|---|---|
| 5,349,226 | 9/1994 | Kawaguchi et al. | 349/152 |
| 5,367,393 | 11/1994 | Ohara et al. | 349/110 |
| 5,617,230 | 4/1997 | Ohgawara et al. | 349/110 |
| 5,745,202 | 4/1998 | Yamauchi et al. | 349/110 |

FOREIGN PATENT DOCUMENTS

| | | | |
|---|---|---|---|
| 54-12596 | 1/1979 | Japan | 349/110 |
| 63-45534 | 3/1988 | Japan . | |
| 64-56416 | 3/1989 | Japan . | |
| 4-78822 | 3/1992 | Japan | 349/110 |
| 7-13171 | 1/1995 | Japan . | |

Primary Examiner—William L. Sikes
Assistant Examiner—Toan Ton
Attorney, Agent, or Firm—Foley & Lardner

[57] ABSTRACT

Light shield areas 20 are formed between terminal groups 15 in a side near outgoing line groups in a display portion of a liquid crystal panel. This configuration is useful for reducing uneven brightness in a horizontal direction in the side near the outgoing lines in the display portion so as to improve the display quality.

10 Claims, 9 Drawing Sheets

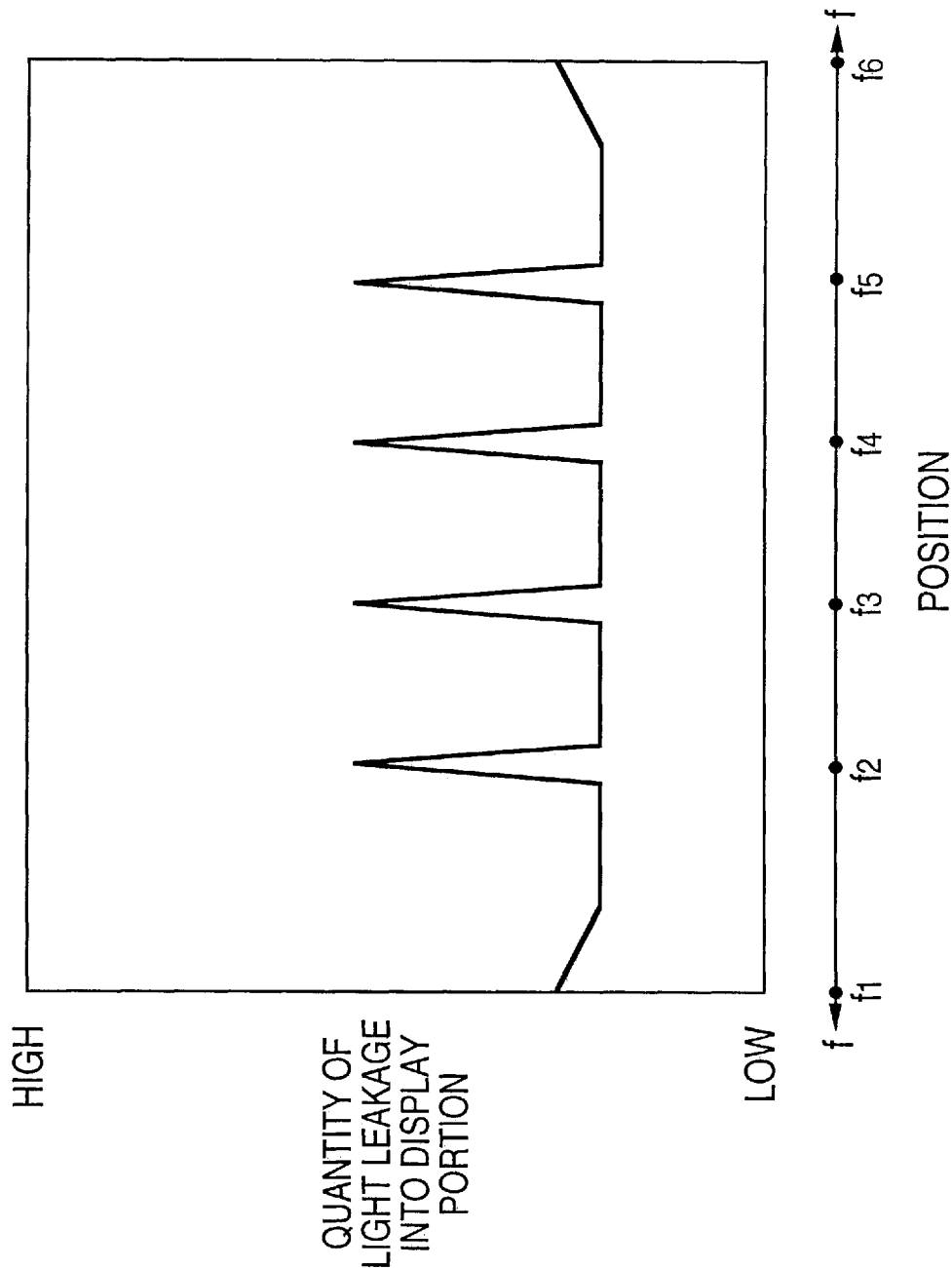

LIQUID CRYSTAL DISPLAY

BACKGROUND OF THE INVENTION

1. Field of the Invention

The present invention relates to a liquid crystal display, and more particularly to an active matrix liquid crystal display.

2. Description of the Prior Arts

A general configuration of the active matrix liquid crystal display is shown in FIG. 8. FIG. 10 and FIG. 11 are sectional views taken along lines D—D and E—E in FIG. 8, respectively. The liquid crystal display comprises a liquid crystal panel 11, a light source 12, and a driving circuit 13. The liquid crystal panel 11 comprises a display portion 14, terminal groups 15, and outgoing line groups 16. Furthermore, the light source 12 comprises a fluorescent tube 17, a reflector 18, and a light guiding plate 19.

Transparent pixel electrodes 22 are formed in a matrix on a TFT glass substrate 21 as shown in FIGS. 10 and 11, and terminals 23 for applying a voltage is arranged in strips as shown in FIG. 9 and then outgoing lines 24 are arranged to connect the terminals 23 to the transparent pixel electrodes 22. Transparent opposing electrodes 26 are arranged on an opposing glass substrate 25. The TFT glass substrate 21 and the opposing glass substrate 25 are laminated with white seal members 27 so as to seal liquid crystal 28 in a gap between the substrates and then a TFT deflector plate 29 and an opposing deflector plate 30 are pasted on the lower side of the TFT glass substrate and on the upper side of the opposing glass substrate, respectively, so as to complete the liquid crystal panel 11.

The light source 12 comprises the fluorescent tube 17, the reflector 18 provided for reflecting light from the fluorescent tube in the same direction, and the light guiding plate 19 provided for radiating light toward the liquid crystal panel. The transparent pixel electrodes 22 are connected to the terminals 23 via the outgoing lines 24. Translucent TCPs (Tape Carrier Packages)31 are attached to the terminal 23. The driving circuit 13 is electrically connected to the terminals 23 of the liquid crystal panel 11 via the TCPs 31.

Next, an operation of the liquid crystal display will be described below. As shown in FIGS. 8, 10, and 11, an electric signal generated by the driving circuit 13 is given to the transparent pixel electrodes 22 in the liquid crystal panel 11 via the TCPs 31 on each of which a driving driver is mounted. When a signal voltage is applied to the transparent pixel electrodes 22, a voltage is applied to the liquid crystal 28 due to an electric potential difference between the opposing electrodes 26 and the pixel electrodes 22. Then, a light transmittance of the liquid crystal panel 11 changes due to electro optical characteristics of the liquid crystal and characteristics of the deflector plates. Further, it changes a quantity of light transmitted by the liquid crystal panel 11 for light from the light source 12. With this change, the liquid crystal display provides a visual display.

FIG. 9 shows an enlarged view of a portion F in FIG. 8. There is no light shield means or areas between terminal groups 15 and the areas are colorless and transparent. Comparing FIG. 10 with FIG. 11, a light ray is not reflected on the terminals 23 and the outgoing lines 24 in a cross section taken along a line 10—10 unlike a cross section taken along a line 11—11 and therefore a light leakage as indicated by a reference numeral 32 in FIG. 10 is incident on the display portion 14 without being transmitted by the liquid crystal 28. Accordingly, the light shield portions are dense as shown in the outgoing lines 24 and the terminals 23 in a portion f—f near the outgoing lines 24 in the display portion 14, and therefore a quantity of light leaking into the display surface is different each other between a place adjacent to the display portion for the area to which the TCP 31 is attached and a place adjacent to the display portion for the area having no light shield element such as the area between the terminal groups 15, which causes uneven luminance in the display portion 14. A space between the outgoing lines is as short as approx. 1.5 $\mu$m. FIG. 12 shows a distribution of a quantity of light leaking from the vicinity of the display portion to the display portion. Reference characters $f_1$ to $f_5$ correspond to respective positions in FIG. 8.

As a prior art example of a measure for improving this uneven luminance, there is a means for blackening seal members (Japanese Unexamined Patent Publication No. 7-13171). It, however, has a problem that development of new materials is required. In addition, there is a means for shutting out light by using a rigid substrate (Japanese Unexamined Patent Publication No. 64-56416), though this method is related to a size of a package of a liquid crystal display and therefore it will not have a high degree of freedom. Besides, there is a means for forming a light shield layer so as to cover seal-member portions (Japanese Unexamined Utility Model Publication No. 63-45534). In this means, the light shield layer is arranged outside a liquid crystal panel, and therefore it may increase the number of processes. Although all of these measures are useful for reducing a quantity of light straying off into the display surface, they cannot completely inhibit uneven brightness which depends on the positions in the display portion between $f_1$ to $f_6$ in FIG. 12. Further, in a middle tone of a high visibility, the unevenness of the brightness is conspicuous to lower the display quality.

SUMMARY OF THE INVENTION

It is an object of the present invention to solve the problem of uneven brightness in a horizontal direction in an area near outgoing lines in a display portion without using any particular process nor materials for light shield in a liquid crystal display.

The present invention is characterized by light shield areas arranged between terminal groups and outgoing line groups in a liquid crystal display having a substrate including transparent pixel electrodes arranged in a matrix on a glass substrate and terminal groups and outgoing line groups for applying a voltage to the transparent pixel electrodes, an opposing substrate including opposing electrodes formed on a glass substrate, and liquid crystal sealed between these substrates. It is also characterized by the light shield areas having a form of strips.

BRIEF DESCRIPTION OF THE DRAWINGS

FIG. 12 is a distribution diagram showing a quantity of light leaking from the vicinity of a display portion to the display portion of a prior art.

DETAILED DESCRIPTION OF THE PREFERRED EMBODIMENTS

Figure 1:
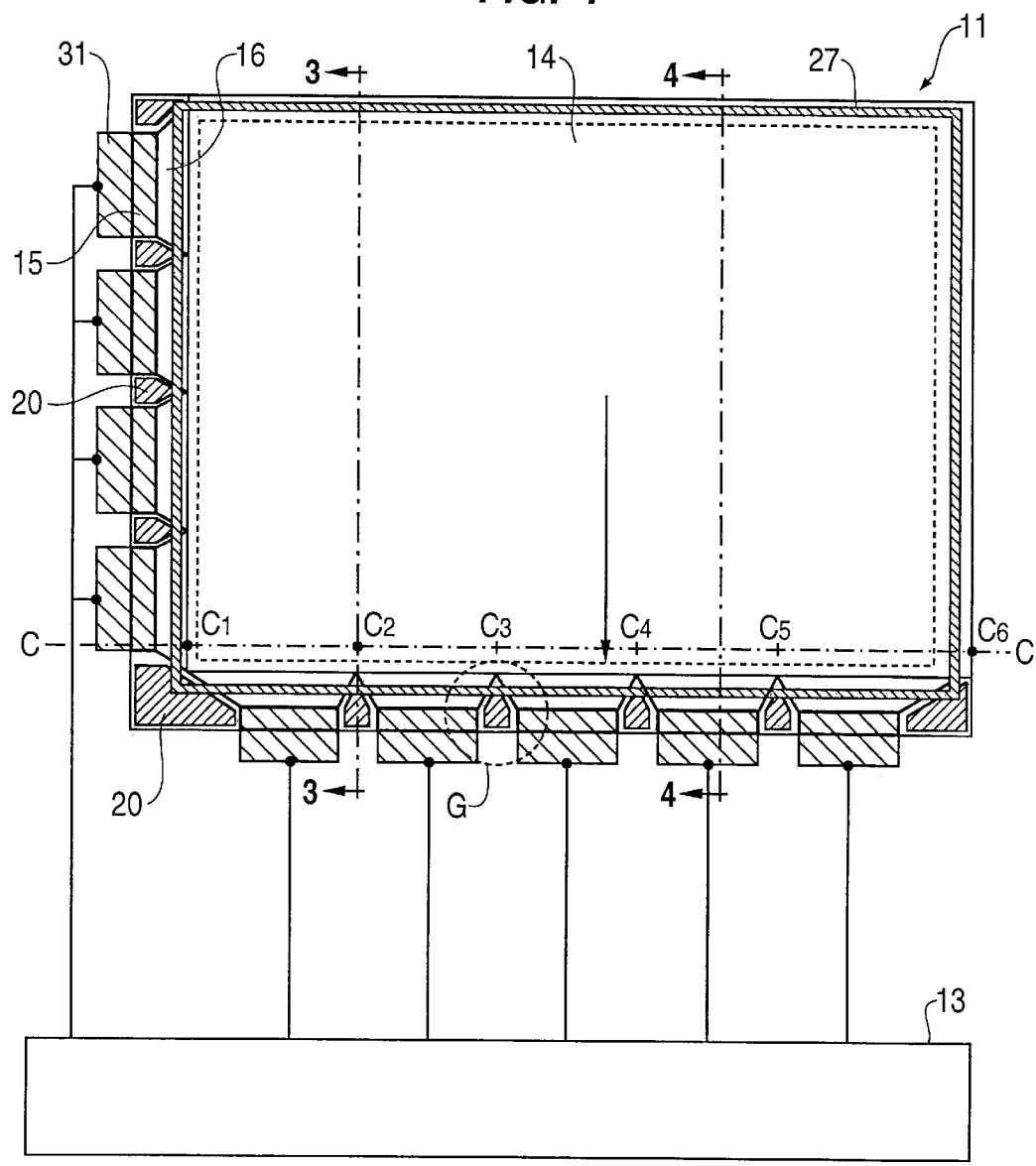
FIG. 1 is a top view of a liquid crystal display device of a first embodiment of the present invention.

Referring to FIG. 1 to FIG. 4, a liquid crystal display of this embodiment comprises a liquid crystal panel 11, a light source 12, and a driving circuit 13. The liquid crystal panel 11 includes a display portion 14, terminal groups 15, outgoing line groups 16, and light shield areas 20. The back light 12 comprises a fluorescent tube 17, a reflector 18, and a light guiding plate 19.

Figure 2:
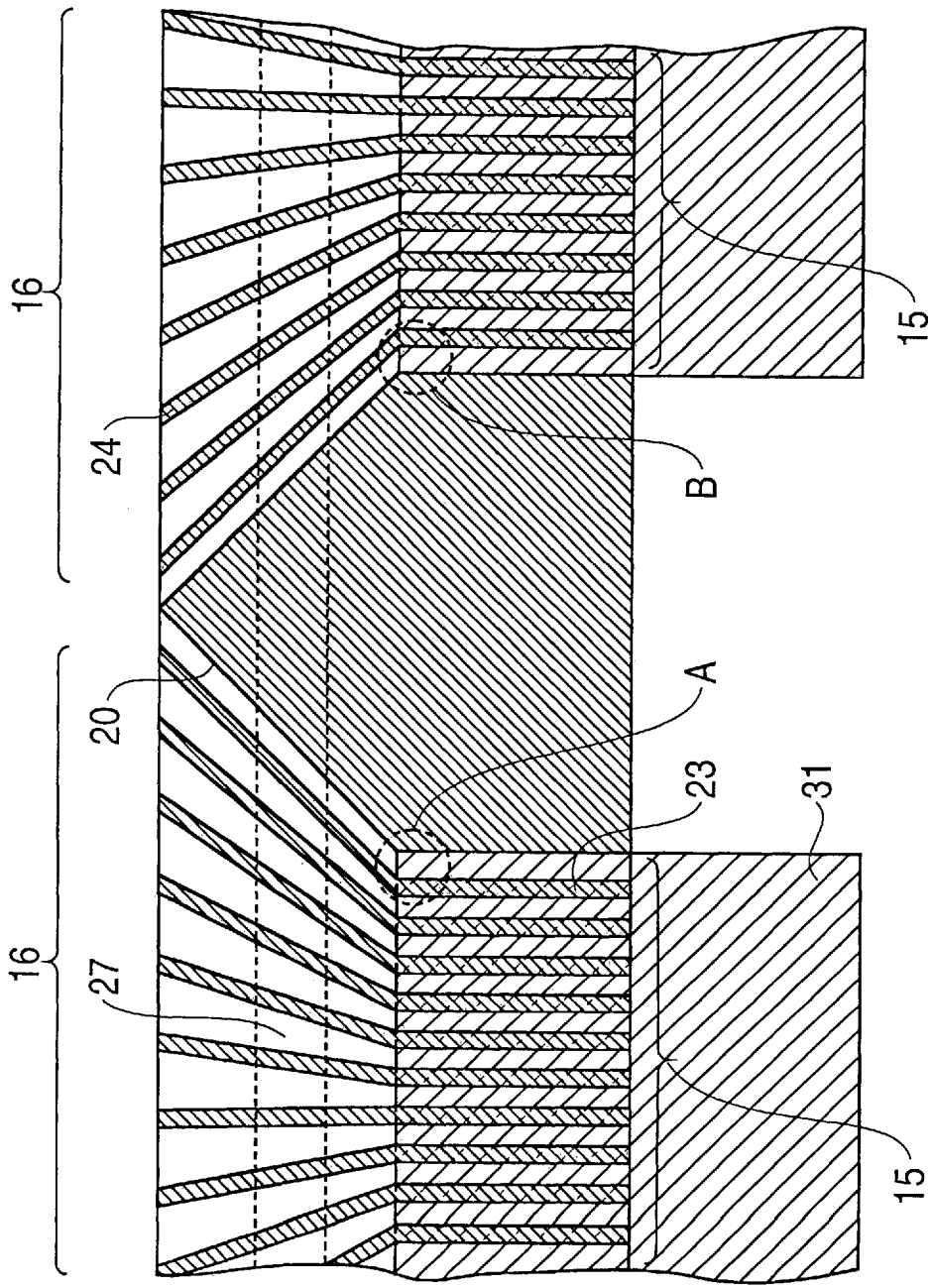
FIG. 2 is an enlarged top view of a portion G in FIG. 1.

FIG. 2 shows an enlarged view of a portion G in FIG. 1. Between adjacent terminal groups 15, there are arranged the light shield areas 20 so as not to be put in contact with respective outgoing lines and terminals 23. In this embodiment, a space between the terminal 23 and the light shield area 20 is the same as a space between respective terminals (approx. 70 $\mu$m), and a space between the outgoing line 24 and the light shield area 20 is the same as a space between respective outgoing lines (approx. 20 $\mu$m).

Figure 3:
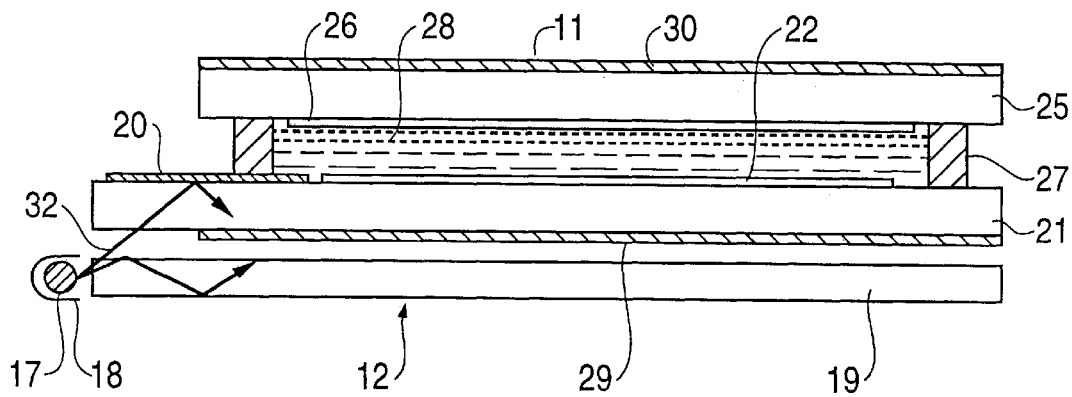
FIG. 3 is a cross-sectional view taken along a line 3—3 in FIG. 1.
Figure 4:
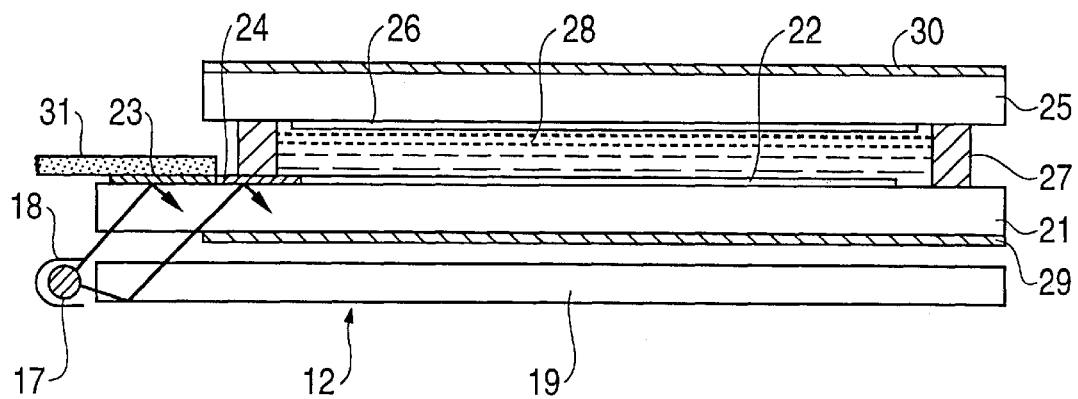
FIG. 4 is a cross-sectional view taken along a line 4—4 in FIG. 1.

As shown in the section views of FIGS. 3 and 4, a plurality of transparent pixel electrodes 22 are formed in a matrix on a TFT glass substrate 21, and the terminals 23 for applying a voltage to respective transparent pixel electrodes are put together as shown in FIG. 2 so as to form respective terminal groups 15. To connect the respective terminals 23 to respective transparent pixel electrodes 22, the outgoing lines 24 are radially arranged. Between the terminal groups 15, the light shield area 20 is formed with the same materials, for example, chrome as for the terminals 23 and the outgoing lines 24 in the same process simultaneously. On an opposing glass substrate 25, transparent opposing electrodes 26 are arranged.

The TFT glass substrate 21 and the opposing glass substrate 25 are laminated with white seal members 27 so as to seal liquid crystal 28 between the substrates, and then a TFT deflector plate 29 and an opposing deflector plate 30 are pasted on the lower surface of the TFT glass substrate and on the upper surface of the opposing glass substrate, respectively, to complete the liquid crystal panel 11.

The back light 12 comprises the fluorescent tube 17, the reflector 18 provided for reflecting light from the fluorescent tube 17 in the same direction, and the light guiding plate 19 provided for radiating the light toward the liquid crystal panel. The transparent pixel electrodes 22 are connected to the terminals 23 via the outgoing lines 24. A translucent TCP 31 is put on each terminal 23. The driving circuit 13 is electrically connected to the terminal groups 15 on the liquid crystal panel 11 via the TCP 31.

Figure 5:
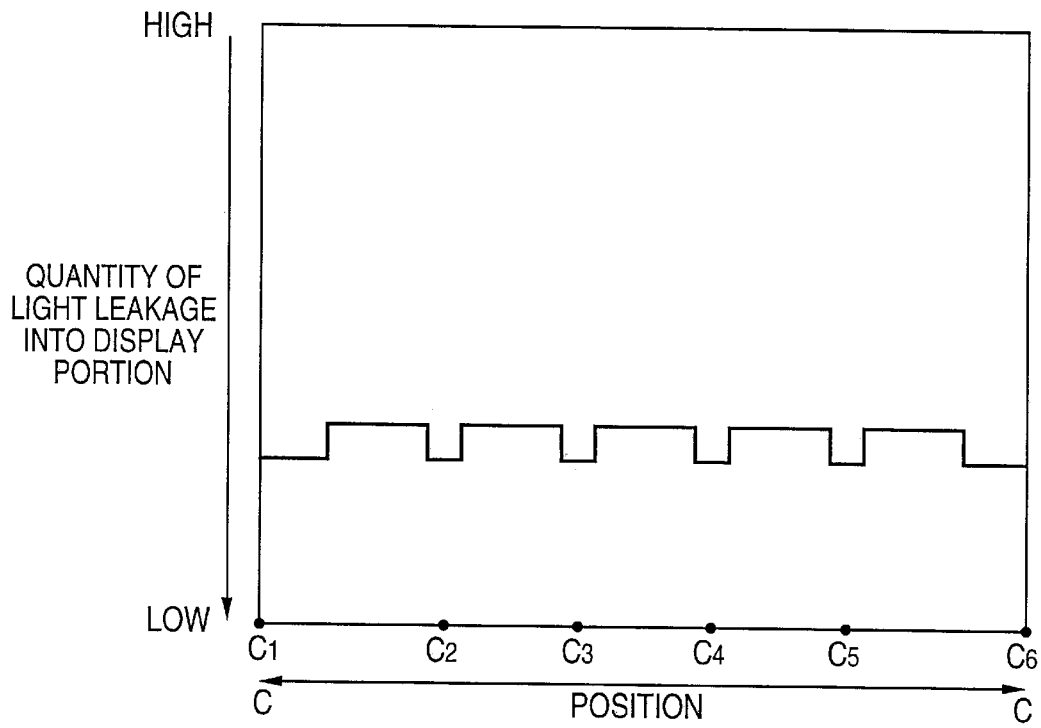
FIG. 5 is a distribution diagram showing a quantity of light leaking from the vicinity of a display portion to the display portion of the first embodiment of the present invention.

The configuration of this embodiment blocks light leakage 32 penetrating obliquely from the vicinity of the display portion to the display portion 14, though it has been found in the prior art as shown in FIG. 3. It decreases a quantity of light penetrating from the light source 12 to the display portion 14 without being transmitted by the liquid crystal 28 between the terminal groups 15, and therefore positional unevenness of the light leakage into the display portion between $C_1$ and $C_6$ in FIG. 1 is reduced in comparison with the conventional example. FIG. 5 shows an uneven brightness between $C_1$ and $C_6$. Reference characters $C_1$ to $C_6$ correspond to respective places in FIG. 1.

In addition, according to this embodiment, the light shield areas 20 are formed simultaneously with forming the terminals 23 and the outgoing lines 24 by using a photolithography technique and therefore they can be formed with high precision of 1.5 $\mu$m without increasing the number of processes. As described in the above, according to this embodiment, any light leakage from areas between the terminal groups 15 is inhibited and unevenness of brightness on the display portion 14 is reduced so as to obtain a favorable display condition.

As apparent from it, any materials can be used for the light shield areas 20 of the present invention, only if the materials do not transmit light. If the same materials as for the electrodes are used, alignment process for forming the light shield areas can be omitted and therefore opaque wiring materials such as molybdenum and aluminum as well as chrome are useful. Since it is more favorable that each light shield area 20 is as large as possible, the light shield area has a pentagon-like shape. Particularly, a shape of a home plate generally used for a baseball game is applied to a single side of the substrate unlike forms of the corners. Additionally, a part of the light shield area 20 extends to a bottom of the seal member 27.

Figure 6:
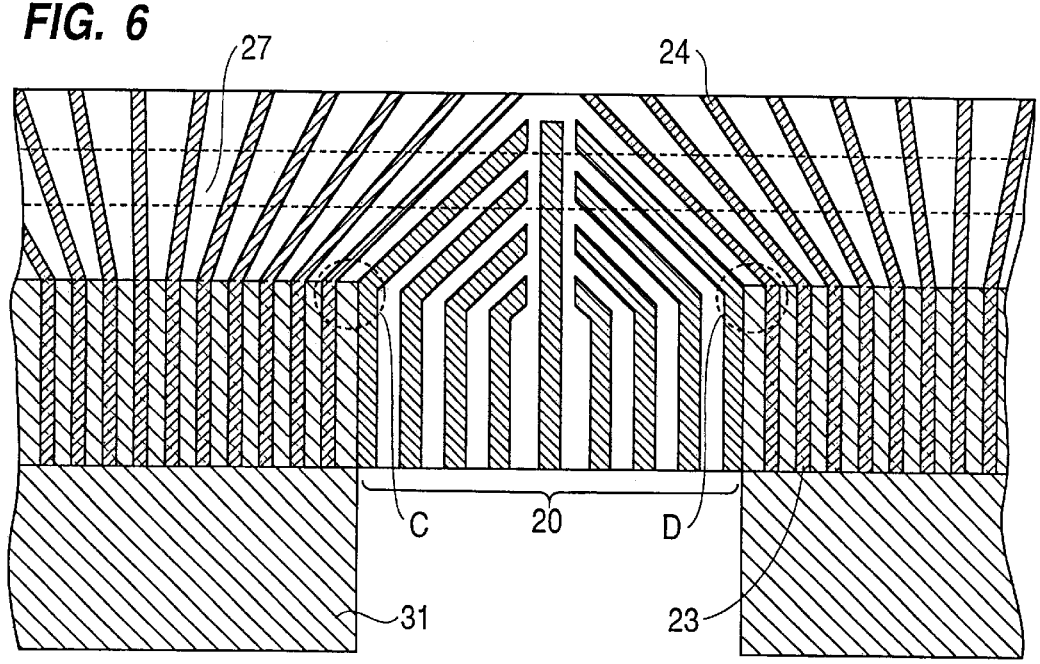
FIG. 6 is an enlarged top view near terminal groups of a second embodiment of the present invention.

FIG. 6 shows a second embodiment of the present invention, illustrating the vicinity of the terminal groups. In this embodiment, the same strip forms as for the outgoing lines 24 and the terminals 23 are used for the light shield areas 20. A width of the strips of the light shield areas is determined as follows: Width of strip=Width of terminal (or width of outgoing line)×(100+Light transmittance of TCP [%])/100

The above light shield area is advantageous for two reasons described below. Firstly, there is no difference in a quantity of light leaking from areas between the terminal groups 15 to the display portion 14, so that the uneven brightness is almost completely removed in the side of the portion adjacent to the wiring in the display portion.

Figure 7:
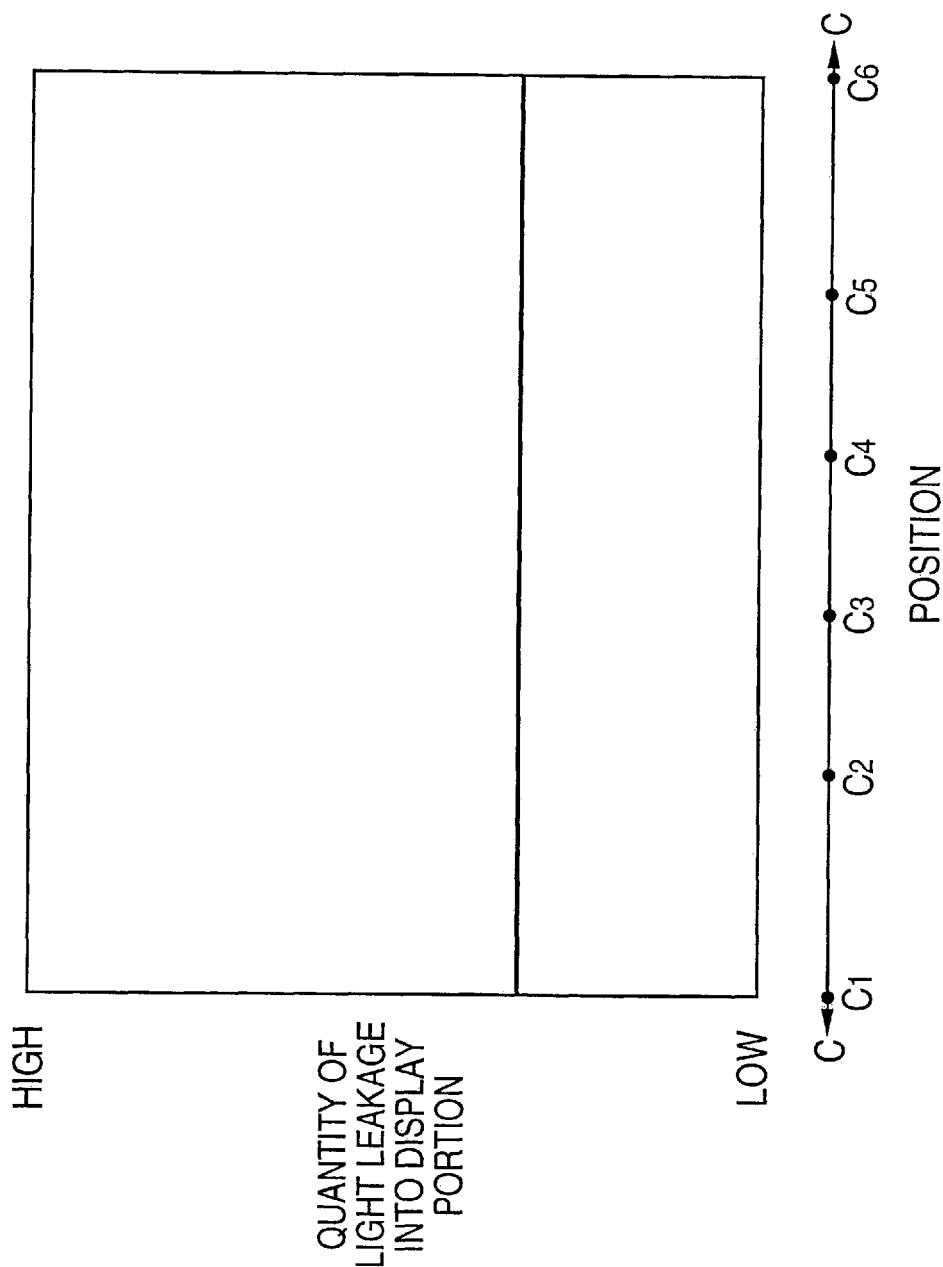
FIG. 7 is a distribution diagram showing a quantity of light leaking from the vicinity of a display portion to the display portion of the second embodiment of the present invention.

FIG. 7 shows a distribution of a quantity of light leaking from the vicinity of the display portion to the display portion in this embodiment. Reference characters $C_1$ to $C_6$ correspond to respective places in FIG. 1. Secondly, while a conduction state of portions A and B puts a portion between the terminals into conduction so as to be defective in FIG. 2, a conduction state of portions C and D does not put a portion between the terminals into conduction in FIG. 6 so as to reduce a possibility of the defective conduction.

As described above, by decreasing a difference of a quantity of light leakage penetrating obliquely from the vicinity of the display portion into the display portion caused by a difference between areas where the terminal group is present and those where it is not according to the present invention, an uneven brightness in a horizontal direction can be suppressed in the area near the outgoing line group in the display surface, so as to improve the display quality.

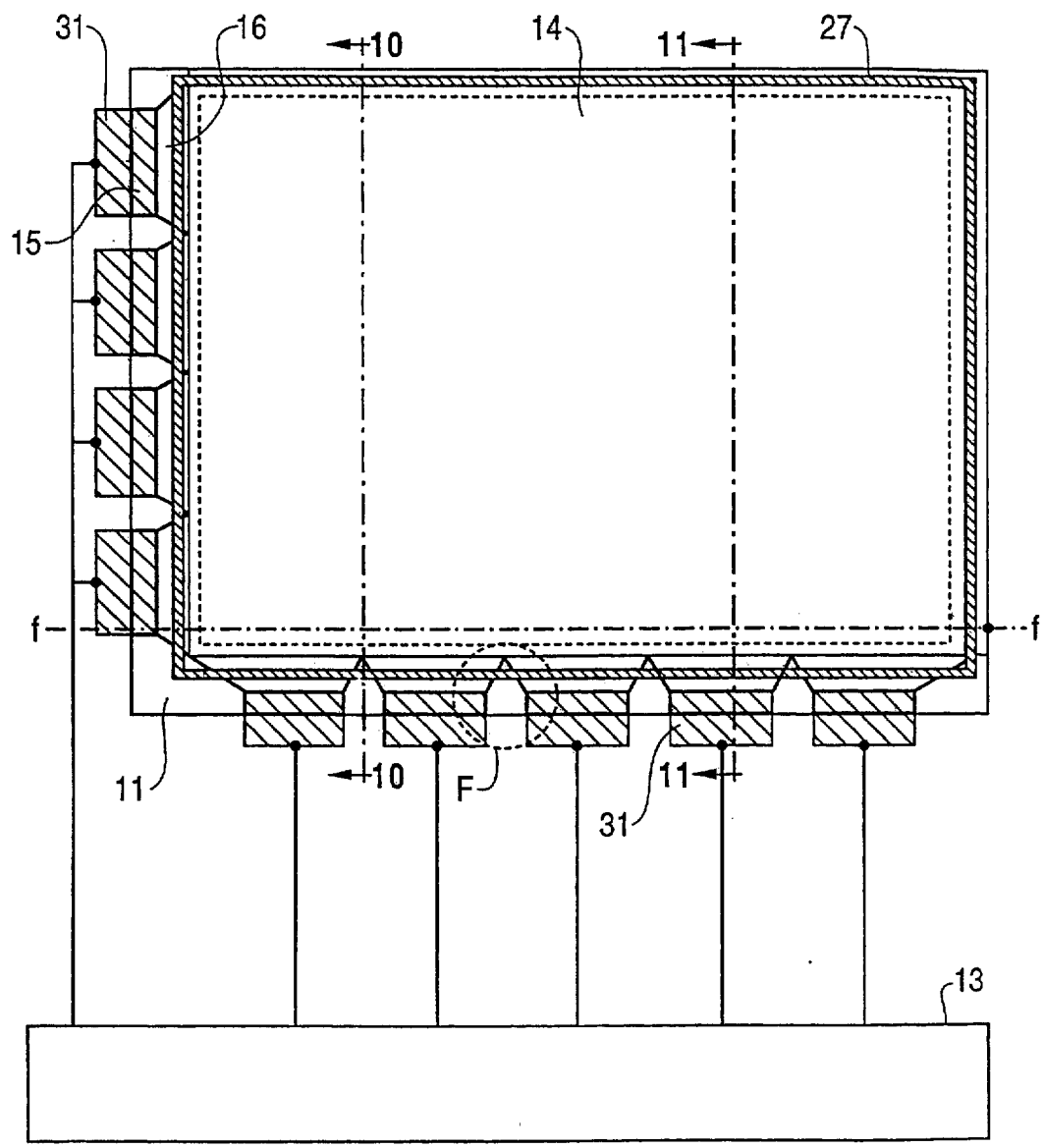

What is claimed is:

1. A liquid crystal display, comprising:

a plurality of transparent pixel electrodes, a first substrate having a plurality of terminal groups electrically connected to said transparent pixel electrodes via outgoing line groups, a second substrate having opposing electrodes opposite to said transparent pixel electrodes, and a liquid crystal sealed between said first and second substrates, and a light shield material provided on regions adjacent to but not touching said terminal groups and said outgoing line groups so as to form light shield areas.

2. A liquid crystal display as defined in claim 1, wherein said light shield areas are an aggregation of a plurality of strips.

3. A liquid crystal display as defined in claim 2, wherein a width of the strips of the light shield areas is determined as follows:

the width of strips=a width of the terminal group (or the width of the outgoing line groups)×(100+Light transmittance of a tape carrier package)/100.

4. A liquid crystal display as defined in claim 1, wherein each of said light shield areas located along one side of said first substrate has a pentagon-like shape.

5. A liquid crystal display, comprising:

a first substrate provided with a plurality of thin film transistors (TFTs) and a plurality of pixel electrodes connected to said TFTs, said first substrate having a plurality of terminal groups electrically connected to said TFTs via outgoing line groups, said terminal groups being spaced apart from each other along a side portion of said first substrate so as to provide an exposed area therebetween;

an opaque material formed on said exposed area without touching said terminal groups and said outgoing line groups;

a second substrate with a counter electrode opposing to said first substrate; and a liquid crystal layer sandwiched between said first substrate and said second substrate.

6. A liquid crystal display according to claim 5, wherein said exposed area has a pentagon-like shape.

7. A liquid crystal display according to claim 5, further comprising a back light provided behind said first substrate.

8. A liquid crystal display according to claim 7, wherein said back light comprises a fluorescent tube, a reflector for reflecting light from said fluorescent tube in a same direction, and a light guiding plate for radiating said light toward said liquid crystal layer through said first substrate.

9. A liquid crystal display according to claim 5, wherein said plurality of terminal groups are provided adjacent to said side portion and said exposed area are provided at a corner portion of said first substrate, and said opaque material is formed on said exposed area at said corner portion.

10. A liquid crystal display, comprising:

a liquid crystal sandwiched between a first substrate and a second substrate;

said first substrate being provided with a plurality of thin film transistors (TFTs) and a plurality of pixel electrodes connected to said TFTs, said first substrate having a plurality of terminal groups electrically connected to said TFTs via outgoing line groups, said terminal groups being spaced apart from each other along a side portion of said first substrate so as to provide an exposed area therebetween;

an opaque material formed on said exposed area without touching said terminal groups and said outgoing line groups;

a light guiding plate provided behind said first substrate; and a light source for providing a light to said light guiding plate, and thereby decreasing a difference of a quantity of light leakage penetrating obliquely from a vicinity of a display portion into the display portion caused by a difference between said exposed area and said terminal groups.

* * * * *

UNITED STATES PATENT AND TRADEMARK OFFICE
CERTIFICATE OF CORRECTION

PATENT NO. : 5,850,275  
DATED : December 15, 1998  
INVENTOR(S) : Makoto WATANABE et al.

Page 1 of 2

Figure 8:
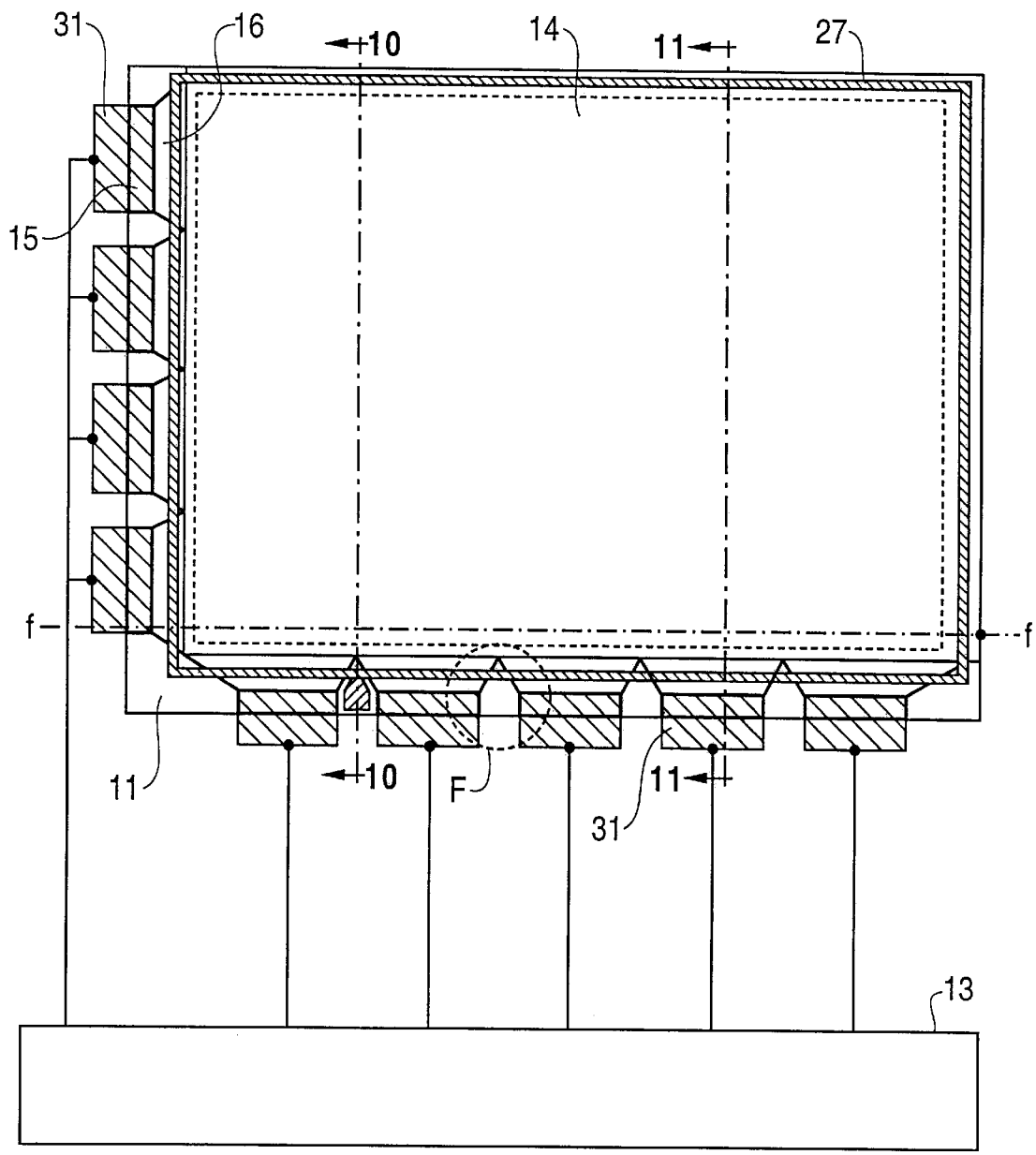
FIG. 8 is a top view of a liquid crystal display device of a prior art.
Figure 9:
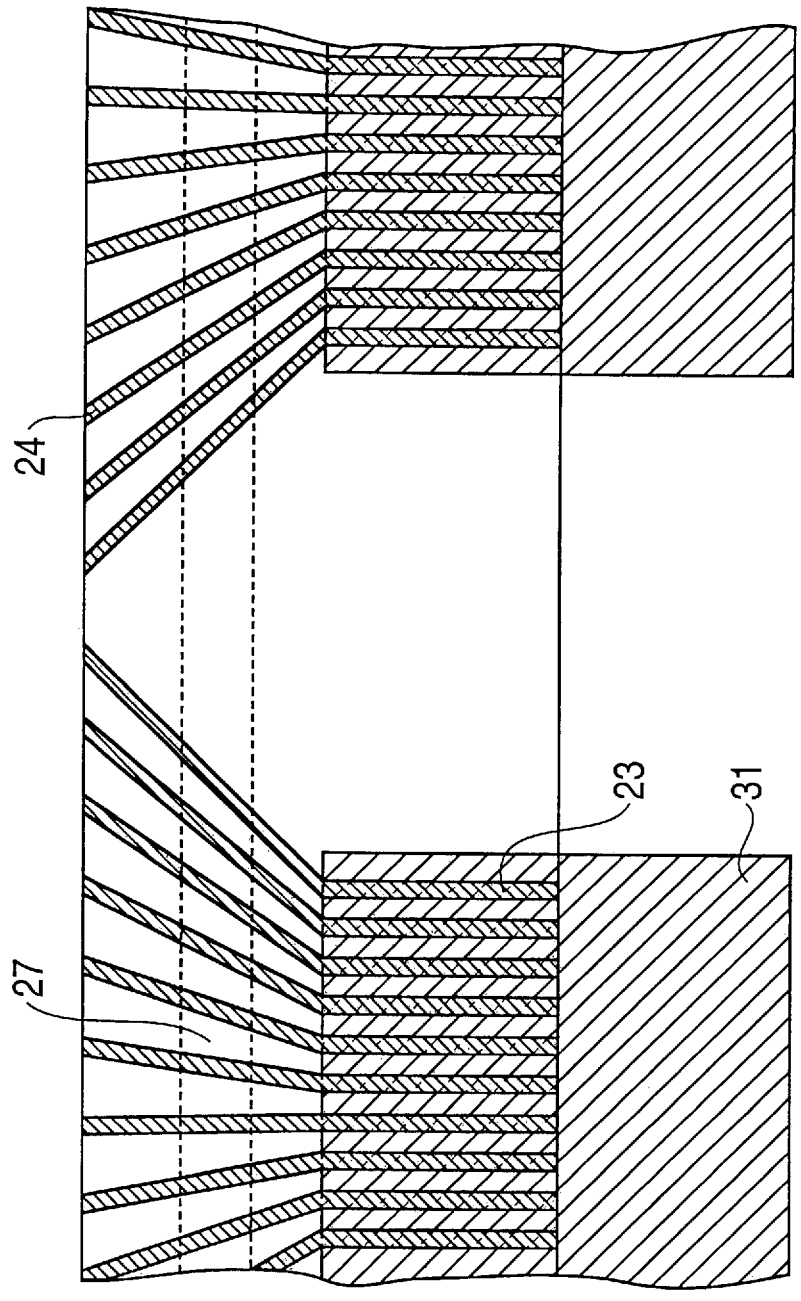
FIG. 9 is an enlarged top view of a portion F in FIG. 8.
Figure 10:
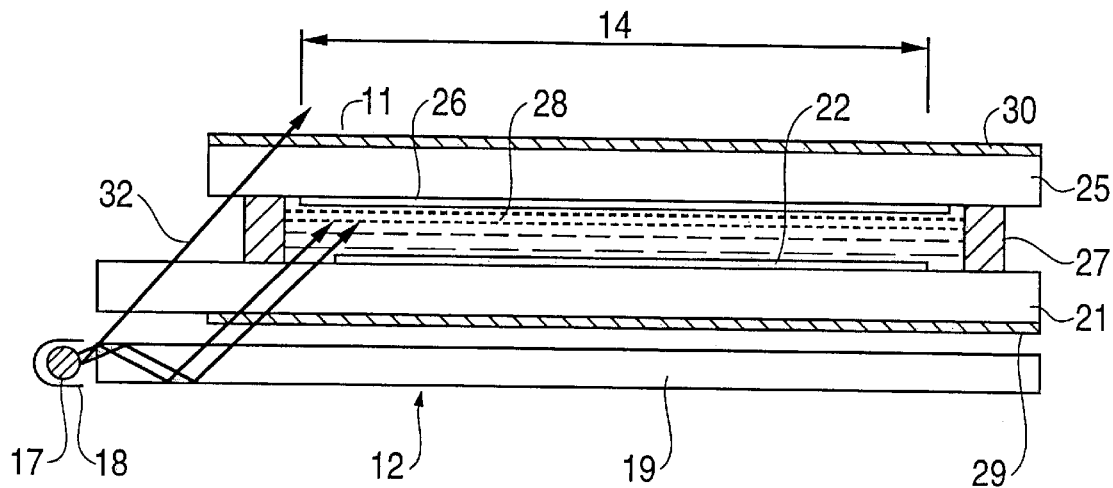
FIG. 10 is a cross-sectional view taken along a line 10—10 in FIG. 8.
Figure 11:
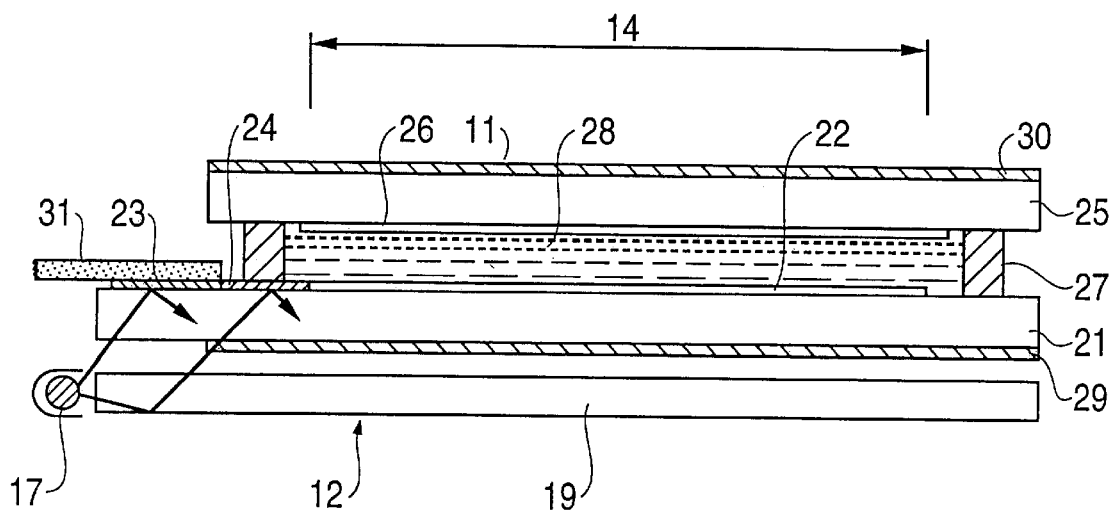
FIG. 11 is a cross-sectional view taken along a line 11—11 in FIG. 8.

It is certified that error appears in the above-identified patent and that said Letters Patent is hereby corrected as shown below:

In the drawings, sheet 6 of 9, consisting of Fig. 8 (Prior Art) is deleted and replaced with Fig. 8 (Prior Art) as shown on the attached page.

Signed and Sealed this

Sixth Day of February, 2001

Attest:

Q. TODD DICKINSON

*Attesting Officer*   Director of Patents and Trademarks